United States Patent [19]

Heitele et al.

[11] Patent Number: 4,917,288
[45] Date of Patent: Apr. 17, 1990

[54] TAMPER PROOF FOLDING BOX

[75] Inventors: Jurgen Heitele; Klaus Mohrhauser, both of Waldkirch, Fed. Rep. of Germany

[73] Assignee: August Faller KG, Waldkirch, Fed. Rep. of Germany

[21] Appl. No.: 113,866

[22] Filed: Oct. 27, 1987

[30] Foreign Application Priority Data

Oct. 28, 1986 [DE] Fed. Rep. of Germany ....... 3636666

[51] Int. Cl.⁴ .............................................. B65D 5/54
[52] U.S. Cl. .................................. 229/102; 206/626; 206/629; 206/807
[58] Field of Search ............... 229/102, 148, 150, 152, 229/153; 206/621, 626, 629, 806, 807

[56] References Cited

U.S. PATENT DOCUMENTS

| | | | |
|---|---|---|---|
| 636,806 | 11/1899 | Johnstone | 229/148 |
| 3,191,484 | 6/1965 | Meyers | 229/51 |
| 3,784,087 | 1/1974 | Styers | 229/62 |
| 3,893,614 | 7/1975 | Meyers | 229/51 |
| 4,150,748 | 4/1979 | Mueller | 206/624 |
| 4,266,671 | 5/1981 | Roccatorte | 206/806 |
| 4,344,533 | 8/1982 | Olsen | 206/621 |
| 4,434,896 | 3/1984 | Beloate | 206/621 |
| 4,508,226 | 4/1985 | Davis et al. | 206/620 |
| 4,573,634 | 4/1986 | Kohler et al. | 229/38 |
| 4,614,297 | 9/1986 | Davis et al. | 206/807 |

FOREIGN PATENT DOCUMENTS

| | | | |
|---|---|---|---|
| 2504892 | 11/1982 | France | 206/807 |
| 309075 | 10/1955 | Switzerland | 229/150 |
| 309373 | 11/1955 | Switzerland | 229/148 |

Primary Examiner—Gary Elkins
Attorney, Agent, or Firm—Wolf, Greenfield & Sacks

[57] ABSTRACT

A folding carton has an insertion flap attached to a crease line on a panel of a carton body. The insertion flap has a second crease line parallel to the first within which lies a slot. The slot is used in conjunction with a second added flap attached to the carton body, which added flap is inserted, and attached in a permanent manner so that a portion of the insertion flap becomes a reusable closure means when the added flap is detached from the body.

4 Claims, 1 Drawing Sheet

TAMPER PROOF FOLDING BOX

BACKGROUND OF THE INVENTION

A standard folding box often used in the pharmaceutical industry is known as a carton with tuck-in ends according to ECMA Code A112. Safety slits are put in tuck-in flaps in order to obtain sure locking. With the closing of the safety slits, one can make sure that the contents of the folding box arrives intact in the hands of the consumer. However, absolute security against theft or disappearance of the product cannot be guaranteed and it is hard to determine tampering. In some cases, to avoid possible mistake as to whether or not there has been tampering, it is possible to lock in flaps with a tuck in end with special sealing or glue as for example hot melt or cold glue.

Prior art methods to avoid tampering can have disadvantages in that besides needing additional apparatus for application, supplementary materials are needed in the packaging procedures on normal carton-forming machines. These materials make the packaging procedure more expensive. In addition, some manufacturing problems can occur and the capacity of the carton forming machines can be adversely influenced. In some cases, safety devices have to be installed because of vapors coming out of hot melt mechanisms.

In many cases, the folding boxes with glued tuck-in ends cannot be reclosed and are not reusable after they are once opened.

SUMMARY OF THE INVENTION

It is an object of this invention to provide a tamper-proof box such as a folding box which can be repeatably opened and reclosed after removing the tamper-proof features.

It is still another object of this invention to provide a means and method of formation of a box in accordance with the preceding object which is economical, safe, and can use substantially conventional equipment in a rapid and efficient manner.

According to the invention, a box having a tubular body with a first and second side has an insertion flap extending from a first side of the body at a first fold line and carries a mating second added flap extending from a second side of the body. The insertion flap has an extension portion and a slot with the slot between the extension portion and the first fold line. The insertion flap is foldable at the first fold line to close the tube and receive the added flap through the slot. Means for locking the added flap into the insertion flap are provided as in the form of an ultrasonic weld whereby the tube can only be opened by breaking the box which would be easily seen or by tearing the added flap at its joint with the tube body whereby the extension portion is foldable to act as a reusable closing means or tab for the box. Preferably, the folding box has plural planar pannels and a closing or insertion flap at either end. Locking means are preferably ultrasonic welding although other means could be used although they are less desirable.

Preferably the insertion flap is generally rectangular having first and second parallel lines of fold with the first folding line at the body and the second folding line carrying within it a slot for receipt of the added flap which is then bent over parallel to an extension portion of the insertion flap and ultrasonically welded. The added flap when torn from the body, acts with the extension portion of the insertion flap to form a closure means.

Preferably a folding carton has an insertion flap attached at a crease line to a panel of a generally rectangular or square cross-section tubular carton body. The insertion flap is divided by a second crease line parallel to the first and a slot is provided within the first crease or fold line. A panel of the carton body which is opposite the panel to which the insertion flap is attached is extended to form an added flap, preferably divided from the panel by a perforated crease line. At the time the carton is originally filled and closed, the added flap is permanently attached to the outermost portion of the insertion flap. By tearing a portion of the added flap where it attaches to the carton body, the insertion flap then becomes a reusable closing means for the box.

It is a feature of this invention that ultrasonic welding can be used with simple ultrasonic equipment in a rapid and efficient manner to form a tamper proof box which can be made to be a reusable closing box.

BRIEF DESCRIPTION OF THE DRAWINGS

The above objects, features and advantages of the present invention will be better understood from a reading of the following drawings in which.

DESCRIPTION OF PREFERRED EMBODIMENTS

Figure 1:
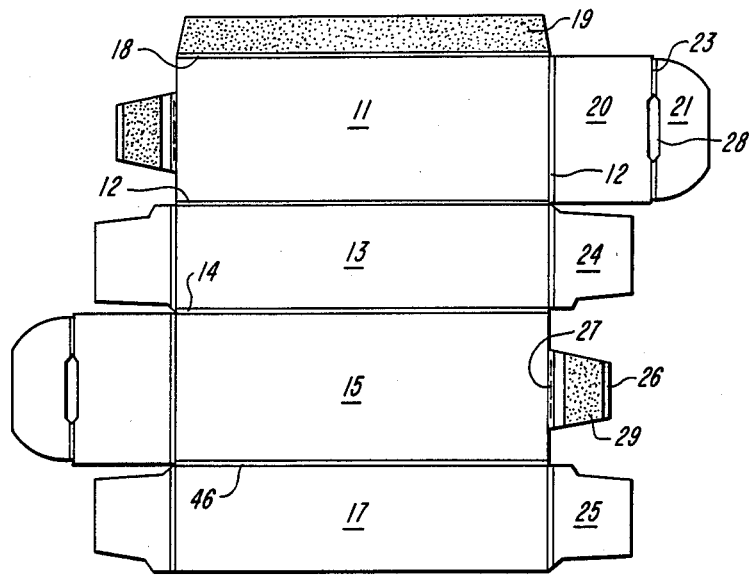
FIG. 1 shows a folding cardboard box blank in flatened condition prior to formation into a rectangular tubular box body.

The box blank shown in FIG. 1 can be of cardboard, plastic or other materials and is foldable into a rectangular cross-section tubular body which is held in place by glueing of the flap as at 19 as known in the art.

As shown in FIG. 1, the carton blank comprises four panels (11, 13, 15, and 17) and a sealing flap (19). The panels are separated by crease lines (12, 14, 16, and 18). The flaps which close the ends of the formed and filled carton (20 and 21) are divided by a crease line (23) and a slot (28). Such flaps are shown in FIG. 1 as extensions of panels 11 and 15. At the opposite ends of panels 11 and 15 are added flaps (26). These added flaps are coated on one side with a dry coating 29 which can be activated to an adhesive state by ultrasonic energy. These added flaps are perforated along their crease line(s) (27).

Figure 2A:
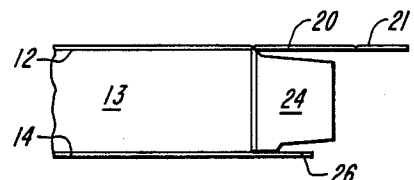
FIGS. 2a-2f show steps in forming a tamper-proof reusable closure on one end of the box with the second end of the box being treated in the same manner, as shown in FIGS. 2a-2f.
Figure 2B:
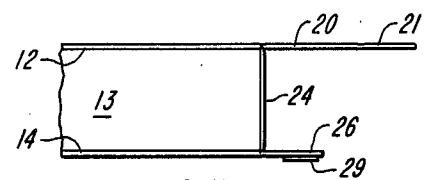
Figure 2C:
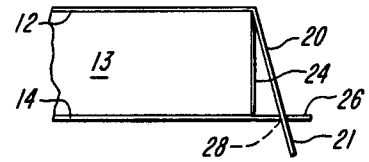
Figure 2D:
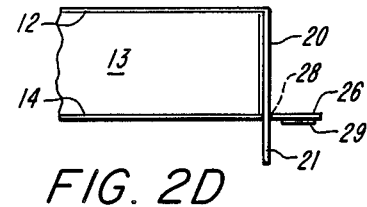

When the carton has been formed and filled, as shown in FIG. 2b, flaps (20) are then folded over the ends of the carton construction and the added flaps (26) on the opposite walls pass through the slots (28) in the closure flap (20) as shown in FIG. 2c and FIG. 2d.

Figure 2E:
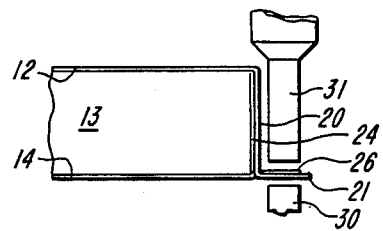

The outer or extension portion (21) of the closure flap (20) is bent backward and brought into contact with sealing flap 26, whereupon an ultrasonic sealing device (30 and 31) clamps flaps 21 and 26 together and welds them permanently as shown in FIG. 2e.

In order to open the sealed carton, flap 16 must be torn away from panel(s) 11 or 15 along the perforated crease line (27). Hence, once opened, the carton can no longer be made to appear as it was at the time it was originally filled and sealed.

Figure 2F:
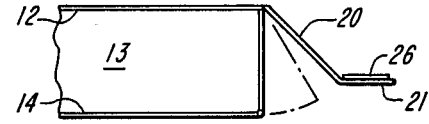

Once opened, however, the carton may be reclosed in an unsealed condition by bending over the joined flaps (21 and 26) and tucking them back into the carton as shown in FIG. 2f.

Note that while a flat cardboard type box of the folding variety as well known is preferred, other boxes can be used and fitted with the closures of the present invention. While it is preferred to form a tamper proof closure on both ends of the box as shown in the drawings, in some cases only one end need have a tamper proof box. The boxes are useful for various items including tooth paste, medicaments, foods, or any other item as may be desired.

While ultrasonic welding of the seal is preferred, since this can be rapidly carried out in a rapid and efficient method, in some cases other closure means can be used, other means including other adhesives, mechanical attachments such as staples, and the like. All closure means are permanent in the sense that if opened, such opening can easily be determined.

The ultrasonic welding apparatus is particularly desirable because it allows rapid and efficient production with conventional ultrasonic machinery attached to conventional box forming machinery. It is a feature of this invention that the method of forming the closure can be simple as shown in FIGS. 2a-2f. Basically, an insertion flap which extends out from a flat panel of a body and has first and second parallel fold lines with a slot therein can be bent at the first fold line to form a closure whereupon the slot passes over an added flap on a second side of the box body. In a next step, the insertion flap which has an extension portion beyond the slot is bent at the extension portion so as to have that extension portion parallel to a portion of the added flap carrying an adhesive which is then clamped between an ultrasonic apparatus and sealed. By tearing the added flap from the body as shown at 2f, along what may be a preformed weakened score line or the like, the tamper proof feature is removed and the extension flap and added flap become a portion of the closure means. Thus, the method of formation is simple and efficient with good safety and easy recognition of tampering of the box.

We claim:

1. A box having a tubular body with a first and second side, an insertion flap extending from a first side of the body at a first fold line and said body carrying a second added flap for mating with said insertion flap and extending from said second side of the body, said insertion flap having an extension portion and a slot with said slot between said extension portion and said first fold line, said insertion flap being foldable at said first fold line to close said tube and receive said added flap through said slot, means for locking said added flap to said insertion flap whereby said tube can only be opened by breaking said added flap so that said extension portion is foldable to act as a reusable closing means for fully closing said box, said box being a folding box having plural substantially planar panels, said box being folded to a set up form and said means for locking comprises an ultrasonic weld.

2. A box having a tubular body with a first and second side, an insertion flap extending from a first side of the body at a first fold line and said body carrying a second added flap for mating with said insertion flap and extending from said second side of the body, said insertion flap having an extension portion and a slot with said slot between said extension portion and said first fold line, said insertion flap being foldable at said first fold line to close said tube and receive said added flap through said slot, means for locking said added flap to said insertion flap whereby said tube can only be opened by breaking said added flap so that said extension portion is foldable to act as a reusable closing means for fully closing said box, said box being folded to a set up form and said added flap is locked to said insertion flap by ultrasonic welding means and sealed thereto.

3. A box in accordance with claim 2 wherein said added flap is broken from said tubular body at a weakened line and acts along with said extension portion to form a tab which acts as a portion of said reusable closure means.

4. A folding carton having a folding insertion flap (20,21) at one end of a panel (11,13), said panel being opposite a second panel which carries an added outwardly extending flap (26) carrying a fold line (27), said carton being formed, filled and sealed with the added flap permanently bonded to the insertion flap at an outermost portion (21) and capable of being folded back to act as a full closure, said insertion flap (20, 21) carrying a slot (28) through which the added flap (26) passes and is sealed to said insertion flap.

* * * * *